Patented Jan. 24, 1950

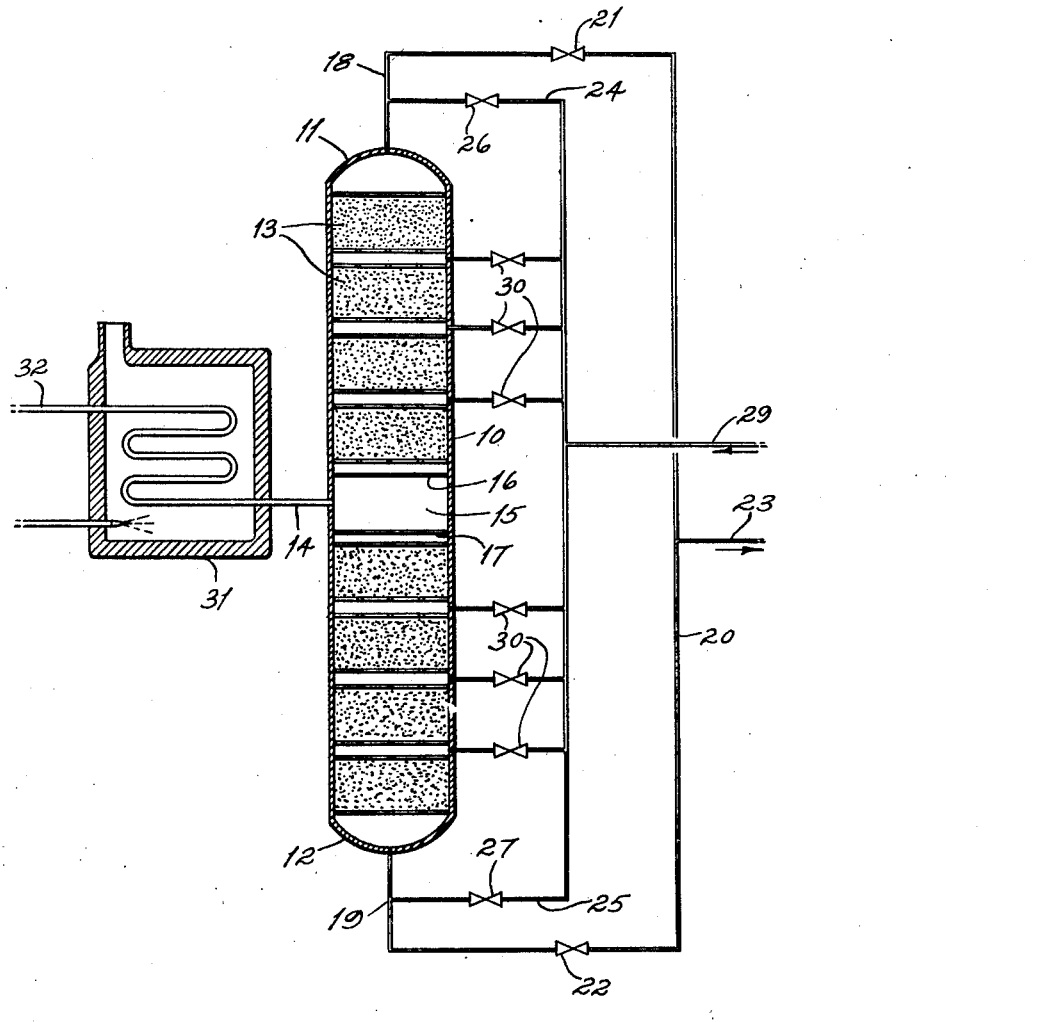

2,495,262

UNITED STATES PATENT OFFICE 2,495,262

CATALYTIC TREATMENT AND THE REGENERATION OF CATALYST IN STATIONARY BEDS

Percival Cleveland Keith, Peapack, N. J., assignor to Hydrocarbon Research, Inc., New York, N. Y., a corporation of New Jersey Application January 21, 1947, Serial No. 723,345

11 Claims. (Cl. 196—52)

The present invention relates to catalytic reactions and is more particularly concerned with alternate employment of a catalyst as a contact mass in association with one or more reactants, and periodic regeneration or revivification.

In its preferred aspect, the invention relates to the catalytic treatment of hydrocarbons, particularly petroleum fractions, whereby the hydrocarbon fraction is thermally altered, refined or otherwise acted upon with the production of more desirable hydrocarbon products. Processes of this preferred character are usually accompanied by progressive loss of catalyst activity which may be due to degeneration of the catalyst or, more frequently, to accumulation of hydrocarbon or carbonaceous deposits which impair the desired contact between the catalytic surfaces and the reactants and thus curtail reaction efficiency.

Probably the most elemental form of apparatus employed in such procedures involves discontinuous operation wherein the reactants are passed in contact with the catalyst until an objectionable loss of activity occurs, following which the catalytic process is discontinued, and the catalyst subjected to revivification. Where it is desirable to provide for the utilization of a continuously supplied reactant feed, and particularly where the product is necessarily conveyed to further treating instrumentalities operating in a continuous manner, a number of catalytic chambers are required, so that at least one will always be operating while another is being subjected to regeneration. So, also, this arrangement demands a multiplicity of connections and controls with an accompanying high initial investment cost. Numerous complex proposals with respect to continuously operating devices have also been advanced.

It is an object of the present invention to provide for the operation of catalytic processes in a single reaction vessel, wherein the catalytic reaction and revivification step may be carried out concurrently, so that feed gases may be continuously supplied at any predetermined rate, and the reaction products made available for further treatment or recovery at what is, for all practical purposes, a continuous flow. Another object of the invention contemplates intermingling of the gasiform products of revivification with the feed to the catalytic step for controlling the progress thereof.

More particularly, the present invention provides a contact mass divided into two sections, between which the reactant feed is supplied for passage selectively into either section. At the same time, means are provided for selectively introducing a revivifying agent into either extremity of the contact mass and meanwhile withdrawing the combined products of reaction and of revivification from the opposite extremity. In this manner, the reactant can be caused to pass selectively through either section, while the revivifying agent passes through the other section and the fluid products of revivification are mingled with the reactant during the passage through the catalyst. In short, the reactant feed contacts the catalyst in its passage from the central point of introduction to the point of outlet, while the revivifying agent passes through the other section and its residual products mixed with the reactant feed move concurrently through the reaction zone and are discharged through a common outlet.

With this arrangement it is possible, merely by alternating the outlet point and the point of introduction of the revivifying agent, to operate substantially continuously with periodic regeneration of the catalyst at any desired interval. Moreover, during each succeeding step the flow is reversed so that the revivifying agent passes through the catalyst section under revivification in a direction opposite to that previously taken by the reactant feed.

In order to more clearly describe the invention, reference is had to the figure of the attached drawing, wherein there is disclosed more particularly one preferred form of apparatus suitable for accomplishing the intended objectives. In this embodiment, the numeral 10 indicates more or less diagrammatically a catalyst chamber having end walls 11 and 12 and provided internally with fixed contact masses indicated symbolically by the reference numeral 13. The manner in which the contact masses are arranged or supported forms no part of the present invention, but may follow any practical convention in the art. Inlet conduit means 14 is provided for the introduction of an incoming stream of reactant which flows into a central zone 15 in the reaction vessel 10 from which it may be selectively passed through distributing plate 16 or 17, as will hereinafter more fully appear. The aforementioned distributing plates may take the form of any suitable reticulated or apertured partitions adapted to distribute the flow of incoming reactant evenly throughout the cross-section of the catalyst mass.

Communication with the respective extremities of the catalyst chamber is provided by conduits 18 and 19 which connect with an outlet header 20 through valves 21 and 22, respectively. The outlet header 20 is provided with a branch pipe 23 for conveying the products to any suitable further means for use or recovery.

Conduits 18 and 19, respectively, communicate with branch pipes 24 and 25 provided with valves 26 and 27, and connected with an inlet header 28 which may be supplied with a catalyst revivifying or regenerating agent from an inlet branch pipe 29. When desired, additional valved branch pipes 30 leading from the inlet header 28 to the interior of the catalyst chamber at spaced points along its axial length permit a controlled distribution of the regenerating agent to the interior of the catalyst mass and therefore, a more uniform temperature can be maintained throughout the catalyst mass undergoing regeneration. Also, these spaced branch pipes 30 permit changing the point of introduction of regenerating agent into the catalyst chamber so that in the course of regeneration, the agent is first introduced at a point farthest from central zone 15 and then in succession at points closer and closer to the central zone 15. In this way, the catalyst is regenerated in segments, the regenerated segments receiving no regenerating agent while other segments are being regenerated. Preferably, however, the branch pipes 30 are used for simultaneous injection of portions of the regenerating agent to several portions of the catalyst mass to be regenerated.

Referring more particularly to the supply of feed reactant at the inlet 14, preheating means may be provided, comprising a furnace 31 which receives the original fresh feed from any suitable source, not shown, through pipe 32 and indirectly supplies heat energy required to reach any desired elevated reaction temperature.

In operation, the fresh feed reactant is supplied through pipe 32, preheated, where necessary, to the elevated temperature required, and supplied through inlet 14 into the central portion 15 of the reaction vessel. With valves 22 and 26 closed and valves 21 and 27 open, the reactant will pass through the upper section of the chamber in intimate contact with the catalyst at reacting temperature. The reaction products are withdrawn through pipe 18, valve 21, header 20 and outlet pipe 23.

Concurrently the revivifying gas passes through inlet pipe 29, header 28, pipe 25, valve 27 and pipe 19 through the lower section of the vessel, completely stripping, revivifying, or regenerating the catalyst as required. The gaseous products of regeneration pass up through the lower section and the central portion 15, and continue through the upper section of the chamber concurrently with the reactant feed.

When the catalyst in the upper section gives evidence of reduced activity, the adjustment of the aforementioned valves is reversed, so that the revivifying gas passes inwardly from header 28 through pipe 24, valve 26 and pipe 18. This causes the flow of reactant feed from pipe 14 to pass into the lower section of the catalyst chamber so that the combined reaction products are recovered through pipe 19, valve 22, header 20 and outlet pipe 23. In short, the regeneration fluid passes through the upper section in a direction opposite to that previously taken by the reactant feed and then passes downwardly, with the latter, through the lower section of catalyst, fully regenerated by treatment with the regenerating gas during the prior period of operation. The direction of flow may be reversed periodically on the basis of any desired time cycle, so that the catalyst is always maintained in favorable condition for reaction. So, also, reversal of flow may take place so rapidly as to cause no appreciable interruption of supply of reactant feed gases.

The present invention, accordingly, provides for the alternate flow of reactant feed through either of two catalytic zones, the revivifying agent passing through the other zone and the fluid products of revivification continuing through the reaction zone in combination with the reactant feed.

It is important to note that the present invention is of particular advantage in connection with catalytic processes, wherein the products of regeneration are relatively inert or unobjectionable in the reaction zone, and wherein such products are readily adaptable to further treatment, separation or recovery from such admixtures. Such is particularly true with many catalytic processes with which I am familiar, as for example many of the aforementioned processes for the thermal refining, purification, or alteration of petroleum fractions. Thus, in the high temperature reforming or cracking of petroleum products, the reaction zone or section may operate in the presence of a suitable catalyst and at reaction temperatures which effect a desired molecular rearrangement of the hydrocarbon feed, in the nature of isomerization, aromatization, cyclization, cracking, dehydrogenation, deoxygenation or the like. Meanwhile, the passage of a revivifying gas such as oxygen, steam, lower hydrocarbon or any desired regeneration agent through the other section may be so adjusted as to strip adsorbed layers of hydrocarbon from the catalyst in the revivifying section, remove objectionable carbonaceous deposits, and thus place the catalyst in active condition again. Normally, the products of revivification will comprise only water vapor, carbon dioxide, nitrogen or the like. In processes operating at a moderate rate of catalyst depletion, the supply of revivifying gas may be maintained at a relatively low rate relative to the rate of reactant feed introduction, whereby only a limited dilution of the reactant occurs in the reaction zone.

This dilution may be of great advantage in controlling the course of the catalytic reaction in many processes where an excessive rate of catalytic activity is undesirable. For example, in the molecular reforming of hydrocarbons with the curtailment of thermal decomposition, the presence of water vapor, as is known, is advantageous and accordingly may beneficially be supplied from the stripping or revivification zone.

In order to illustrate the invention more specifically, in connection with one preferred process, reference will now be made to the treatment of hydrocarbon fractions boiling in the gasoline range for readjusting the molecular structure to a condition more suitable for operation in internal combustion engines. Operating in this manner, a typical relatively low anti-knock value hydrocarbon fraction is preheated in the heater 31 to a temperature of 850° F. and passed through a mass of bauxite catalyst at a space velocity of one volume per hour per volume of catalyst on the basis of the liquid volume of the hydrocarbon feed, for a period of 4 minutes.

During this period, a preheated mixture of steam and oxygen of initial 98% purity in the volume ratio of 50:1 is passed through a second mass of catalyst identical with the first mentioned at a rate such that substantially all of the carbonaceous matter deposited on the catalyst during a preceding period is burned. The effluent gaseous products from the second named mass are mixed with the incoming hydrocarbon feed to the first catalytic mass and the mixture passed therethrough, with subsequent recovery of the gaseous products.

After this 4 minute period, the flow is readjusted observing the same conditions as before, but with the hydrocarbon feed and the stream of oxygen and steam introduced respectively into the second and first catalyst masses in a direction opposite to the direction of flow during the previous period.

The reaction products are subjected to condensation and separation to remove normally gaseous constituents and to recover a motor gasoline fraction of materially improved anti-detonation properties.

While reference has been made to a bauxite filling, any suitable alternative catalyst may be employed such as activated alumina or any of the conventional catalytically active clays, such as montmorillonite and kaolin, or diatomaceous earth. The invention is particularly advantageous in connection with silica-alumina mixtures conventionally used in catalytic cracking or in connection with dehydrocyclization catalyst, such as chromium oxide, alumina, molybdenum oxide complexes and molybdenum oxide, silica and alumina mixtures. In short, the invention is not limited to reforming, but is extremely useful in connection with any conventional catalytic treatment of hydrocarbons. Obviously, the temperatures and pressures which I propose to maintain in conducting the present operation are in each case, those characteristically optimum for the catalytic process in question and which, being well known in the art, form no part of the present invention. It may be stated, however, that the temperature range for such processes may vary, for example, from 600° F. to 1200° F. Thus, temperatures substantially above 750° F., as for example 850° F., may be employed to promote controlled cracking of the incoming stream of reactant feed, and with a diatomaceous earth employed primarily for the purpose of cracking, temperatures of 1100° F. will be desirable. Dehydro-cyclization is generally carried out at somewhat higher pressures, as for example in the order of 50 to 500 pounds per square inch, and at temperatures of from 925° F. to 1000° F. with catalysts of the aluminum oxide-vanadium oxide-chromium oxide and molybdenum oxide class.

While the preferred aspect of the invention contemplates catalytic modification of hydrocarbon fractions, it is of particular advantage in connection with the treatment of products from the well known catalytic synthesis of hydrocarbons by the reduction of carbon monoxide with hydrogen. These products normally require molecular reforming for an essential improvement in detonation characteristics.

Thus, by way of exemplification, a stream of product of the foregoing process, in the motor gasoline boiling range, is subjected, at a feed temperature of 850° F., to passage alternately through beds of activated Arkansas bauxite comprising fixed granules of about $\frac{1}{16}$ inch in diameter in the manner described in the previous example. Passage is continued for six minutes as before during which time a similar bed of catalyst, previously subjected to treatment with the hydrocarbon feed is treated with a mixture having, by volume 97% steam and 3% oxygen; the rate of flow was adjusted by experiment so as to very nearly completely revivify the catalyst over the time period involved. The temperature in the catalyst bed under revivification rose to about 900° F.; the gaseous products comprising essentially carbon dioxide and carbon monoxide were passed, along with the steam, directly into the catalytic reaction zone with the fresh feed hydrocarbon and withdrawn with the products of reaction. The hydrocarbon products were condensed and the normally liquid products separated with a yield of liquid hydrocarbons equal to about 95% by weight of liquid hydrocarbons introduced into the system. The properties of initial hydrocarbon feed and the liquid hydrocarbon product compare as follows:

|  | Treatment | |
|---|---|---|
|  | Before | After |
| Gravity, ° A. P. I. | 64.2 | 65.8 |
| ASTM Distillation: |  |  |
| I. B. P., ° F. | 112 | 115 |
| 10% | 140 | 141 |
| 50% | 215 | 213 |
| 90% | 340 | 349 |
| E. P. | 389 | 394 |
| ASTM Octane No. | 62 | 76 |

With increased reaction temperatures over those given in the previous example, a predominance of cracked products is noted in the reaction effluent. On the other hand, the reaction temperature may be substantially decreased to as low as, for example 600° F., with substantial reforming but decreased cracking. In the foregoing example, the steam was sufficient to prevent excessive overheating of the catalyst in the regeneration zone to a temperature at which the catalyst would be deactivated or otherwise injured.

While the invention has been illustrated in connection with an embodiment wherein the respective catalyst sections are contained in a single vessel, it is not so limited, but may embody a plurality of vessels or catalyst zones connected in series, which may be alternately subjected to passage of the reactant feed with concurrent admixture of revivifying reaction products from a catalyst chamber under revivification. It is contemplated in accordance with the present invention that the overall flow through the several catalyst zones or sections be periodically reversed in such a manner that with each successive step, the revivifying agent passes in an opposite direction to that previously taken by the reactant feed.

With more particular reference to mention of deoxygenation above, it is important to note that hydrocarbon products such as those resulting from the catalytic synthesis of hydrocarbons by the reduction of carbon oxides with hydrogen, normally contain at least a small proportion of oxygenated compounds. In the catalyst reforming process referred to as well as during conventional cracking, decomposition or deoxygenation of these oxygenated compounds occurs and accounts in some measure for the improved product. The term hydrocarbons as used herein includes generally oxygenated hydrocarbons and the treating processes contemplated include decomposition or deoxygenation of such materials.

Obviously, the valves may be automatically controlled on a predetermined time cycle, or may be arranged to adjust concurrently in the proper relation.

Many other specific modifications and adaptations of the present invention will be obvious to those skilled in the art from a consideration of the foregoing more or less exemplary disclosure, and it is therefore understood the invention is not limited to any such details except as defined by the following claims.

I claim:

1. In the catalytic treatment of a reactant feed including periodic regeneration of the catalyst, the steps which comprise supplying said reactant feed under reaction conditions to a central point in the catalyst mass and directing said reactant feed in contact with said catalyst mass toward one extremity thereof, introducing a catalyst regenerating agent at the other extremity of said catalyst mass while withdrawing reaction and regeneration products from the first-named extremity, and thereafter, periodically reversing the flow of the reactant feed through said mass by introducing the regenerating agent at the first-named extremity of said mass and withdrawing products of reaction and regeneration from the said other extremity.

2. In the catalytic treatment of reactant fluid including periodic regeneration of the catalyst, the steps which comprise supplying said reactant fluid to an intermediate portion of an elongate catalyst mass maintained at reaction temperature, directing the flow of said reactant fluid through said catalyst mass to either end thereof, introducing a flow of catalyst revivifying fluid into the other end of said catalyst mass, withdrawing the combined fluid products of reaction and revivification from the first-mentioned end of said catalyst mass, and periodically introducing the said revivifying fluid into said first-mentioned end and withdrawing the combined fluid products of reaction and revivification from the said other end of said catalyst mass.

3. The process as defined in claim 2 wherein the catalyst revivifying fluid consists essentially of steam and substantially pure oxygen.

4. In the catalytic treatment of reactant fluid including periodic regeneration of catalyst disposed in two spaced catalyst zones with a common inlet therebetween, the steps which comprise directing the flow of reactant fluid selectively through either of said spaced zones toward outlets associated with said catalyst zones at points spaced from said common inlet by selectively maintaining a unidirectional flow of catalyst revivifying fluid into either of additional inlets in the vicinity of said outlets while concurrently withdrawing combined fluid products of reaction and revivifycation solely from the outlet associated with the other catalyst zone and thereafter periodically reversing said unidirectional flow of catalyst revivifying fluid.

5. The process as defined in claim 4 wherein the catalyst revivifying fluid consists essentially of steam and substantially pure oxygen.

6. In the vapor phase catalytic treatment of a reactant feed including periodic regeneration of the catalyst, the steps which comprise supplying said reactant feed in vapor phase continuously to a zone intermediate and in communication with separate portions of the catalyst, introducing a gaseous catalyst regenerating agent at the extremity of one of the portions of catalyst remote from said intermediate zone, withdrawing gaseous reaction and regeneration products from the extremity of a second portion of the catalyst remote from said intermediate zone, and thereafter periodically reversing the flow of the reactant feed by introducing the regenerating agent at the extremity of the second portion of the catalyst and withdrawing products of reaction and regeneration from the said extremity of the first portion.

7. A process as defined in claim 6, wherein additional gaseous catalyst regenerating agent is introduced into contact with said catalyst at a point intermediate the point of introduction of the regenerating agent at the extremity of the catalyst and the point of introduction of the reactant feed.

8. In the vapor phase catalytic treatment of a reactant feed including periodic regeneration of the catalyst, the steps which comprise supplying a hydrocarbon vapor as said reactant feed continuously to a zone intermediate and in communication with separate portions of the catalyst, introducing a gaseous catalyst regenerating agent comprising oxygen at the extremity of one of the portions of the catalyst remote from said intermediate zone, withdrawing gaseous reaction and regeneration products from the extremity of the second portion of the catalyst remote from said intermediate zone and thereafter periodically reversing the flow of the hydrocarbon feed by introducing the gaseous regenerating agent at the extremity of the second portion of the catalyst and withdrawing products of reaction and regeneration from the said extremity of the first portion.

9. The process as defined in claim 8 wherein the gaseous catalyst regenerating agent comprising oxygen consists essentially of a preponderance of steam and a minor proportion of substantially pure oxygen.

10. The process as defined in claim 8 wherein the hydrocarbon feed is a fraction boiling in the gasoline range and the catalyst is bauxite.

11. A process for the catalytic treatment of hydrocarbons boiling within the motor gasoline boiling range resulting from catalytic synthesis by the reduction of carbon monoxide with hydrogen, which comprises passing said hydrocarbons as feed in vapor phase continuously to a reaction zone at a point intermediate separate portions of activated bauxite at a temperature of about 850° F., introducing a gaseous catalyst regenerating agent comprising steam and oxygen at the extremity of one of the portions of the catalyst remote from said intermediate zone, withdrawing gaseous reaction and regeneration products from the extremity of the second portion of the catalyst remote from said intermediate zone, and thereafter periodically reversing the flow of hydrocarbon feed by introducing the regenerating agent at the extremity of the second portion of the catalyst and withdrawing products of reaction and regeneration from the said extremity of the first portion.

PERCIVAL CLEVELAND KEITH.

REFERENCES CITED

The following references are of record in the file of this patent:

UNITED STATES PATENTS

| Number | Name | Date |
|---|---|---|
| 2,150,930 | Lassiat | Mar. 21, 1939 |
| 2,242,387 | Boyd | May 20, 1941 |
| 2,284,603 | Belchetz et al. | May 26, 1942 |
| 2,285,401 | Bates | June 9, 1942 |
| 2,383,218 | Schulze | Aug. 21, 1945 |